US010430841B1

(12) United States Patent
Shah

(10) Patent No.: US 10,430,841 B1
(45) Date of Patent: Oct. 1, 2019

(54) SYSTEMS FOR DETERMINING CUSTOMER INTEREST IN GOODS

(71) Applicant: Capital One Services, LLC, McLean, VA (US)

(72) Inventor: Salik Shah, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/951,816

(22) Filed: Apr. 12, 2018

(51) Int. Cl.
G06Q 30/00 (2012.01)
G06Q 30/02 (2012.01)
H04W 4/029 (2018.01)
H04W 4/35 (2018.01)

(52) U.S. Cl.
CPC ..... G06Q 30/0281 (2013.01); G06Q 30/0201 (2013.01); H04W 4/029 (2018.02); H04W 4/35 (2018.02)

(58) Field of Classification Search
CPC ............... G06Q 30/00; G06Q 30/0633; G06Q 30/0201; G06Q 30/0281; H04W 4/029; H04W 4/35
See application file for complete search history.

(56) References Cited

U.S. PATENT DOCUMENTS

| 7,376,640 B1* | 5/2008 | Anderson | G06F 17/3087 701/533 |
| 8,538,829 B1 | 9/2013 | Hu | |
| 9,552,587 B2* | 1/2017 | Naqvi | H04W 4/029 |
| 9,665,881 B1* | 5/2017 | Ward | G06Q 30/0239 |
| 9,824,387 B2* | 11/2017 | Haver | G06Q 30/0639 |
| 9,838,649 B2* | 12/2017 | Nelson | G06Q 30/0201 |
| 2005/0049914 A1* | 3/2005 | Parish | G06Q 20/10 705/14.26 |
| 2006/0010027 A1* | 1/2006 | Redman | G06Q 10/063116 705/7.16 |
| 2006/0131401 A1* | 6/2006 | Do | G06Q 20/201 235/383 |

(Continued)

OTHER PUBLICATIONS

Abhaya Asthana et al. "An Indoor Wireless System for Personalized Shopping Assistance", Mobile Computing System and Applications, 1994, pp. 69-74. (Year: 1994).*

(Continued)

Primary Examiner — Naeem U Haq
(74) Attorney, Agent, or Firm — Finnegan, Henderson, Farabow, Garrett & Dunner, LLP

(57) ABSTRACT

A system for determining customer interest in goods includes one or more memory devices storing instructions and one or more processors configured to execute the instructions. The processors are configured to receive customer location data from a smart device associated with a customer indicating the customer is within a retail venue of a retailer and to monitor, based on the customer location data, a current location of the customer within the retail venue. The processors are further configured to receive goods location data indicating locations of goods for sale within the retail venue and determine that the customer is interested in a particular good for sale within the retail venue based on the current customer location remaining in proximity to the location of the particular good for a predetermined period of time. The processors also conduct a search of pricing of the particular good at one or more other retailers and send a price comparison to the customer.

19 Claims, 10 Drawing Sheets

(56) References Cited

U.S. PATENT DOCUMENTS

| | | |
|---|---|---|
| 2006/0138219 A1 | 6/2006 | Brzezniak |
| 2006/0167790 A1 | 7/2006 | Gould |
| 2006/0169772 A1 | 8/2006 | Page |
| 2006/0289635 A1* | 12/2006 | Lin ............... G06Q 30/06 235/383 |
| 2007/0192294 A1 | 8/2007 | Ramer |
| 2007/0282665 A1* | 12/2007 | Buehler ............... G06Q 30/02 705/7.29 |
| 2008/0245863 A1* | 10/2008 | Buchheit ............... G06Q 30/02 235/383 |
| 2009/0144122 A1* | 6/2009 | Ginsberg ............... G06Q 10/04 705/7.31 |
| 2010/0082440 A1* | 4/2010 | Vaidyanathan ....... G06Q 30/02 705/14.72 |
| 2010/0179857 A1 | 7/2010 | Kalaboukis |
| 2011/0276385 A1 | 11/2011 | Keller |
| 2012/0024947 A1 | 2/2012 | Naelon |
| 2012/0116861 A1 | 5/2012 | Dobyns |
| 2012/0323685 A1* | 12/2012 | Ullah ............... G01S 5/02 705/14.53 |
| 2014/0149191 A1* | 5/2014 | Aguayo ............... G06Q 30/0611 705/14.1 |
| 2015/0120576 A1* | 4/2015 | Nguyen ............... G06Q 30/0222 705/80 |
| 2015/0169597 A1* | 6/2015 | Edge ............... G06F 17/3087 707/751 |
| 2015/0221020 A1 | 8/2015 | Kobres |
| 2016/0012453 A1* | 1/2016 | Naqvi ............... H04W 4/029 705/7.29 |
| 2016/0014556 A1* | 1/2016 | Naqvi ............... H04W 4/029 455/456.3 |
| 2016/0042375 A1* | 2/2016 | Naqvi ............... H04W 4/029 705/7.34 |
| 2016/0269857 A1* | 9/2016 | Naqvi ............... G06F 17/30336 |
| 2017/0364863 A1 | 12/2017 | Kessel |

OTHER PUBLICATIONS

Aamir Hasan et al. "Key Drivers Influencing Shopping Behavior in Retail Store" The IUP Journal of Marketing Management, vol. XIV, No. 3, 2015 (Year: 2015).*

* cited by examiner

SYSTEMS FOR DETERMINING CUSTOMER INTEREST IN GOODS

TECHNICAL FIELD

The present disclosure generally relates to a system for determining customer interest in goods.

BACKGROUND

Reliably and seamlessly price checking goods within retail venues is a burdensome task for customers purchasing multiple, or even unique, goods.

As one example, a customer at a brick-and-mortar store location may select upwards of 30 items, and place them into a single shopping cart. The customer may wish to conduct an item-by-item price check. However, in order to do so, the customer must manually run the price comparisons, either with a search engine or a smart device application, or automatically with a scanning system, and hope the information is accurate. Such a shopping experience can lead to errors, such as purchasing the wrong good or amount of goods based on a believed deal.

As another example, a particular brick-and-mortar store location may lose customers, who were once very loyal, to other retail venues offering more competitive pricing. The other venues can be found online, at other physical locations, or both. The customers may prefer shopping at the particular brick-and-mortar store location but price comparisons for like items they find on the internet, or from a shopping application, uncover competing prices that are too hard to pass up. The store owner is unaware of the competing pricing and never has an opportunity to offer a responsive discount in order to retain the customers.

Moreover, while some computerized solutions exist for tracking customer proximity to goods, and offering discounts, such solutions typically stop there. This is inefficient and does not collect and utilize data for the benefit of both the store owner and the customer.

The present disclosure provides systems and devices to solve these and other problems.

SUMMARY

In the following description, certain aspects and embodiments of the present disclosure will become evident. It should be understood that the disclosure, in its broadest sense, could be practiced without having one or more features of these aspects and embodiments. Specifically, it should also be understood that these aspects and embodiments are merely exemplary. Moreover, although disclosed embodiments are discussed in the context of a processor bracket and, it is to be understood that the disclosed embodiments are not limited to any particular industry.

Disclosed embodiments include a system for determining customer interest in goods. The system comprises one or more memory devices storing instructions and one or more processors configured to execute the instructions. The processors are configured to receive customer location data from a smart device associated with a customer indicating the customer is within a retail venue of a retailer and to monitor, based on the customer location data, a current location of the customer within the retail venue. The processors are further configured to receive goods location data indicating locations of goods for sale within the retail venue and determine that the customer is interested in a particular good for sale within the retail venue based on the current customer location remaining in proximity to the location of the particular good for a predetermined period of time. The processors also conduct a search of pricing of the particular good at one or more other retailers and send a price comparison to the customer for the particular good based on results of the price search.

It is to be understood that both the foregoing general description and the following detailed description are exemplary and explanatory only, and are not restrictive of the disclosed embodiments, as claimed.

BRIEF DESCRIPTION OF DRAWINGS

The accompanying drawings, which are incorporated in and constitute a part of the specification, illustrate several embodiments and, together with the description, serve to explain the disclosed principles. In the drawings.

DETAILED DESCRIPTION

Figure 1A:
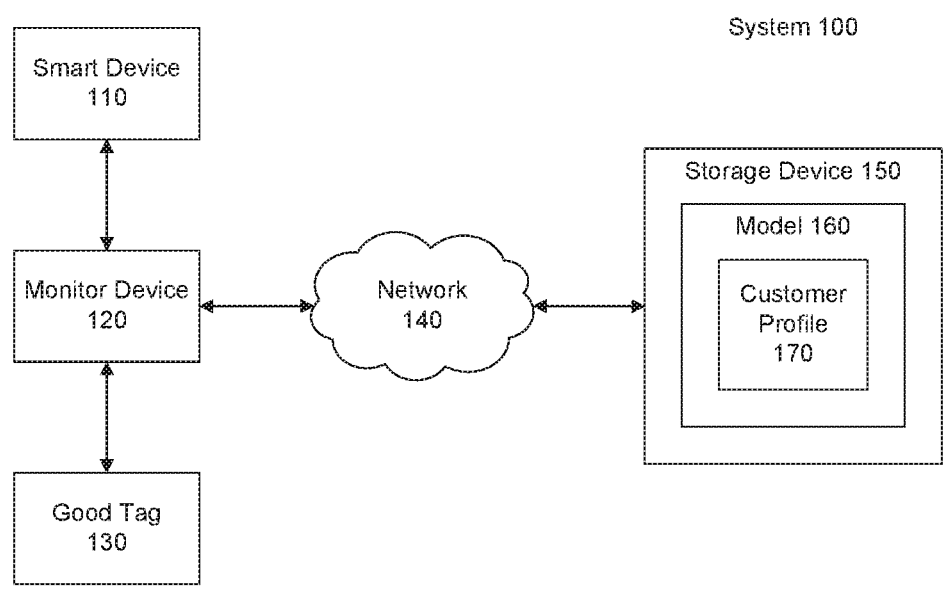
FIG. 1A is a block diagram of an exemplary system, consistent with disclosed embodiments.

An initial overview of proximity detection technology is provided immediately below and then specific exemplary embodiments of systems and methods for determining customer interest in goods are described in further detail later. The initial overview is intended to aid in understanding some of the useful technology relevant to systems and methods disclosed herein, but it is not intended to limit the scope of the claimed subject matter.

One means of proximity detection technology is via communication either between two devices or communication gathered on a network encompassing two devices. Wireless communication is more typical due to the nature and intentions associated with proximity detection (i.e., wired communication likely provides some indication of proximity already). The wireless communication of proximity based content enables a user associated with a user device to send or receive content, via a user device, when the user device is within a limited proximity of a second device associated with a location or object (e.g., a good for sale). The content may be related to or associated with the location or object. Also, the sending or receiving of the content may be triggered by the user entering a limited proximity of the location or the object.

Wireless communication is any form of communication between two devices where some point of communication does not require a physical wired connection. Some wireless communication is based on radio frequencies, but wireless communication is not limited to the radio frequencies.

In one example, wireless communication and proximity detection can be accomplished with a user's mobile computing device (e.g., a smartphone). While the mobile computing device is described herein as being mobile, the mobile computing device may be a fixed device. The mobile computing device can be a handheld computing device, a wearable computing device, a portable multimedia device, a smartphone, a tablet computing device, a laptop computer, a smart watch, an embedded computing device, or similar device. An embedded computing device is a computing device that is inlayed in a selected object such as a vehicle, a watch, a key fob, a ring, a key card, a token, a poker chip, a souvenir, a necklace amulet, and so forth. A computing device may be embedded in substantially any type of object. The mobile computing device can be a device that is user owned, rented, leased, associated with, or otherwise in the possession of the user.

The wireless communication can be between the user's mobile device and a second proximity device, such as a tag, that is associated with or near the object/good. Like the user device, the tag can be fixed or mobile. The tag may be another mobile computing device or another device. The tag may be owned by the user or another entity.

The location proximity based content that is communicated between the user device and tag, or routed through a network, may include content that is locally stored on each device, content that is received through a wired or wireless network from a remote storage device, or a combination thereof. The communicated content may be generated by the user or another entity either locally or remotely, and in advance or contemporaneously with the sending of the content.

Reference will now be made in detail to exemplary embodiments, examples of which are illustrated in the accompanying drawings and disclosed herein. Wherever convenient, the same reference numbers will be used throughout the drawings to refer to the same or like parts.

The disclosed embodiments are directed to systems and methods for determining customer interest in goods for sale. While some computerized solutions exist for tracking customer proximity to goods, and offering discounts, such solutions typically stop there. This is inefficient and does not collect and utilize data for the benefit of both the store owner and the customer. Furthermore, none of the other solutions utilize machine learning to properly stock a retail venue, or model purchasing behavior on micro and macro levels for individual or multiple customers and locations. And there is no system for combining such data to determine customer interest in goods by analyzing their proximity to a good, their past purchasing behaviors and interests, and market pricing trends to further determine a competitive price adjustment.

There exists substantial untapped consumer data sources that can be utilized to provide improved services for prospective customers. One such area of underutilized data is in determining customer interest in goods. In particular, customer interest could be determined based on their proximity, and duration of proximity, to specific goods in a physical retail venue, as well as the association of those specific goods to other goods in the retail venue. To make this determination, a system for determining customer interest would need to collect or receive input data regarding the location and movement of the goods, as well as the location and movement of the customer. Once the system collects or receives data from which to determine a customer interested in a particular good, then the system could further utilize that data to provide an improved service, such as facilitating price comparison or offering reduced pricing for the particular good.

The following description provides examples of systems and methods for determining customer interest in goods. The arrangement of components shown in the figures is not intended to limit the disclosed embodiments, as the components used in the disclosed systems may vary.

FIG. 1A depicts an illustrative system 100 for determining a customer interest in goods in accordance with aspects of an embodiment of the present disclosure. System 100 includes a customer smart device 110, which can be any user device discussed above, in wireless communication with a monitor device 120 which is in further communication with a tag device 130 that indicates a physical location of a good for sale within a retail venue. As discussed above, the means of communication between devices 110, 120, and 130 can vary and the particular combination can also vary such that device 110 may communicate directly with device tag 130 and vice versa. Monitor device 120 further communicates with a network 140. It will also be understood that devices 110, 120, and 130 may also communicate directly with network 140 or through network 140. Customer smart device 110, monitor device 120, tag device 130, and network 140 further communicate with a storage device 150. Storage device 150 stores an information model 160 and a customer profile 170.

Through these illustrative components, system 100 collects and utilizes data for the benefit of both the store owner and the customer. For instance, by collecting location and proximity data with devices 110, 120, and 130, storage device 150 can further analyze customer interests in prospective goods with model 160. A store owner may further use model 160 analysis and historical data stored in customer profile 170 to offer a competitive service, through price adjustments, product placements, product pairings, etc., for the customer. The customer, for benefiting from this beneficial experience, will in turn stay loyal to the store owner.

Figure 1B:
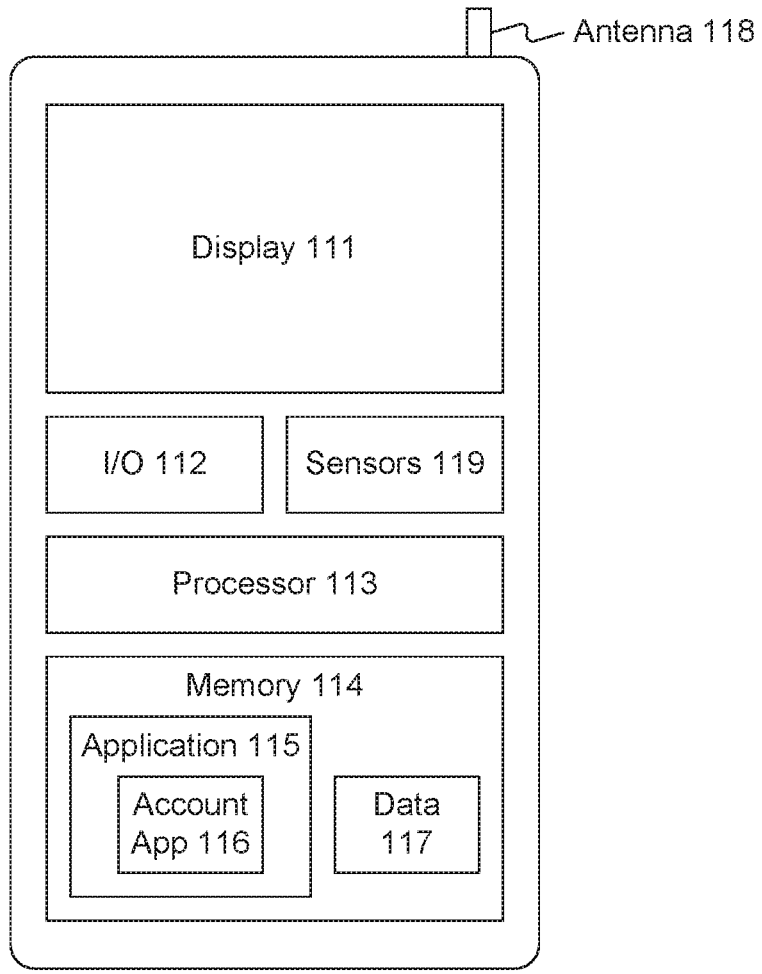
FIG. 1B is a diagram of an exemplary electronic system, consistent with disclosed embodiments.

FIG. 1B illustrates an exemplary configuration of smart device 110, consistent with disclosed embodiments. Variations of smart device 110 may be used to implement portions or all of each of the devices of system 100, such as monitor device 120, good tag 130, and storage device 150. Likewise, even though FIG. 1B depicts smart device 110, it is understood that devices 120, 130 and 150 may implement portions illustrated by exemplary smart device 110. As shown, smart device 110 includes a display 111, an input/output ("I/O") device 112, one or more processors 113, and a memory 114 having stored therein one or more program applications 115, such as an account app 116, and data 117. Smart device also includes an antenna 118 and one or more sensors 119. One or more of display 111, I/O devices 112, processor(s) 113, memory 114, antenna 118, or sensor(s) 119 may be connected to one or more of the other devices depicted in FIG. 1B. Such connections may be accomplished using a bus or other interconnecting device(s).

Processor 113 may be one or more known processing devices, such as a microprocessor from the Pentium™ or Atom™ families manufactured by Intel™, the Turion™ family manufactured by AMD™, the Exynos™ family manufactured by Samsung™, or the Snapdragon™ family manufactured by Qualcomm™. Processor 113 may constitute a single core or multiple core processors that executes parallel processes simultaneously. For example, processor 113 may be a single core processor configured with virtual processing technologies. In certain embodiments, processor 113 may use logical processors to simultaneously execute and control multiple processes. Processor 113 may implement virtual machine technologies, or other known technologies to provide the ability to execute, control, run, manipulate, store, etc., multiple software processes, applications, programs, etc. In another embodiment, processor 113 may include a multiple-core processor arrangement (e.g., dual, quad core, etc.) configured to provide parallel processing functionalities to allow smart device 110 to execute multiple processes simultaneously. One of ordinary skill in the art would understand that other types of processor arrangements could be implemented that provide for the capabilities disclosed herein.

I/O devices 112 may include one or more devices that customer smart device 110 to receive input from a customer and provide feedback to the customer. I/O devices 112 may include, for example, one or more buttons, switches, speakers, microphones, or touchscreen panels. In some embodiments, I/O devices 112 may be manipulated by the customer 105 to input information into smart device 110.

Memory 114 may be a volatile or non-volatile, magnetic, semiconductor, tape, optical, removable, non-removable, or other type of storage device or tangible (i.e., non-transitory) computer-readable medium that stores one or more program applications 115 such as account app 116, and data 117. Data 117 may include, for example, customer personal information, account information, and display settings and preferences. In some embodiments, account information may include items such as, for example, an alphanumeric account number, account label, account balance, account issuance date, account expiration date, account issuer identification, a government ID number, a room number, a room passcode, and any other necessary information associated with a customer and/or an account associated with a customer, depending on the needs of the customer, entities associated with network 140, and/or entities associated with system 100.

Program applications 115 may include operating systems (not shown) that perform known operating system functions when executed by one or more processors. By way of example, the operating systems may include Microsoft Windows™, Unix™, Linux™ Apple™, or Android™ operating systems, Personal Digital Assistant (PDA) type operating systems, such as Microsoft CE™, or other types of operating systems. Accordingly, disclosed embodiments may operate and function with computer systems running any type of operating system. Smart device 110 may also include communication software that, when executed by processor 113, provides communications with network 140, such as Web browser software, tablet, or smart hand held device networking software, etc. Smart device 110 may be a device that executes mobile applications for performing operations consistent with disclosed embodiments, such as a tablet, mobile device, or smart wearable device.

Program applications 115 may include account app 116, such as an account app for activating, setting up, and configuring a customer access to communication with devices 120, 130, and 150 through the customer account. In some embodiments, account app 116 may include instructions which cause processor 111 to connect to monitor device 120, good tag 130, and/or storage device 150 via network 140.

Smart device 110 may also store data 117 in memory 114 relevant to the examples described herein for system 100. One such example is the storage of device 110 location proximity to goods data, obtained from sensors 119, for smart device 110, or alternatively, received from monitor device 120, and/or tag device 130. Data 117 may contain any data discussed above relating to the wireless communication of proximity based determinations. The data 117 may be further associated with information for a particular customer or multiple customers.

Sensors 119 may include one or more devices capable of sensing the environment around smart device 110 and/or movement of smart device 110. In some embodiments, sensors 119 may include, for example, an accelerometer, a shock sensor, a gyroscope, a position sensor, a microphone, an ambient light sensor, a temperature sensor, and/or a conductivity sensor. In addition, sensors 119 may include devices for detecting location, such as, a Global Positioning System (GPS), a radio frequency triangulation system based on cellular or other such wireless communication and/or other means for determining device 110 location.

Antenna 118 may include one or more devices capable of communicating wirelessly. As per the discussion above, one such example is an antenna wirelessly communicating with network 140 via cellular data or Wi-Fi. Antenna 118 may further communicate with monitor device 120, tag device 130, or directly with storage device 150 through any wired and wireless means.

Figure 1C:
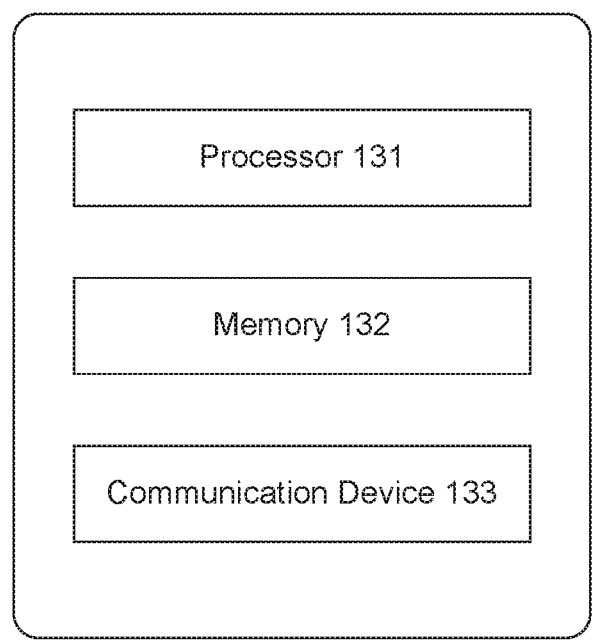
FIG. 1C is a diagram of an exemplary electronic system, consistent with disclosed embodiments.

FIG. 1C shows an exemplary tag device 130 consistent with disclosed embodiments. Tag device 130 may include components that may execute one or more processes to determine proximity and location via a processor 131. Device 130 may further communicate with monitoring device 120 via near-field communication (NFC), Wi-Fi, Bluetooth, cellular, and/or other such forms of wireless communication discussed herein. In certain embodiments, tag device 130 may include a power supply, such as a rechargeable battery, configured to provide electrical power to one or more components of tag device 130, such as processer 131, a memory 132, and a communication device 133. Alternatively, device 130 may not include a power supply and, rather, communicate through passive RFID or other non-powered tag technology. In this non-powered instance, tag device 130 may only transmit data when it receives ambient energy transmitted by smart device 110 (e.g., emitting a signal after receiving energy from radio waves generated by smart device 110). Thus, in embodiments where tag device 130 is a non-powered tag, device 130 may receive electromagnetic energy from smart device 110 and use that energy to transmit data stored in tag device 130. Tag devices 130 in some embodiments, may be attached to or otherwise associated with goods. Each tag device 130 may include a unique identifier and/or other information identifying an item to which a tag is attached. In some embodiments, tag devices 130 may be implemented as Bluetooth Low Energy (BLE) tags. Tag devices 130 may also include sensors such as temperature sensors, weight sensors, motion sensors, location sensors, proximity sensors, accelerometers, or the like.

In some embodiments, tag devices 130 may be further associated with goods located at specific locations throughout retail venue 100. Tag devices 130 may further communicate with monitoring device 120, network 140, and storage device 150. Network 140 and/or storage device 150 can store the mapped specific locations of tag devices 130. In addition, the retail venue itself can be mapped, stored on network 140 or in storage device 150, such that system 100 provides directions to customer smart device 110. The directions may be to tag devices 130 of interest, or to general features of the retail venue (such as exits, checkouts, changing rooms, bathrooms, etc.). In addition, the mapped locations may be based on tag devices 130, or alternatively, to locations the goods themselves. The system 100 can locate smart device 110 within the retail venue, through network 140 or monitoring device 120, and network 140 (and/or monitoring device 120) can further monitor smart device 110 location relative to tag devices 130. This tag device 130 mapping data may be further associated with the communicated data from tag devices 130 to monitor their locations, and in turn, further used to determine tag devices 130 proximity to smart device 110. As smart device 110 comes within proximity to tag devices 130, system 100 can provide smart device 110 with good's information associated with tag device 130. And as the smart device 110 moves about the retail venue, the system 100 can provide updated tag device 130 information to smart device 110 based on their respective proximities.

Returning to FIG. 1A, network 140 may comprise any type of computer networking arrangement used to exchange data. For example, network 140 may be the Internet, a private data network, virtual private network using a public network, and/or other suitable connection(s) that enables system 100 to send and receive information between the components of system 100. Network 140 may also include a public switched telephone network ("PSTN") and/or a wireless network such as a cellular network, WiFi network, or other known wireless network capable of bidirectional data transmission. Network 140 may also comprise any local computer networking used to exchange data in a localized area, such as WiFi, Bluetooth™ Ethernet, Radio Frequency, and other suitable network connections that enable components of system 100 to interact with one another.

Figure 1D:
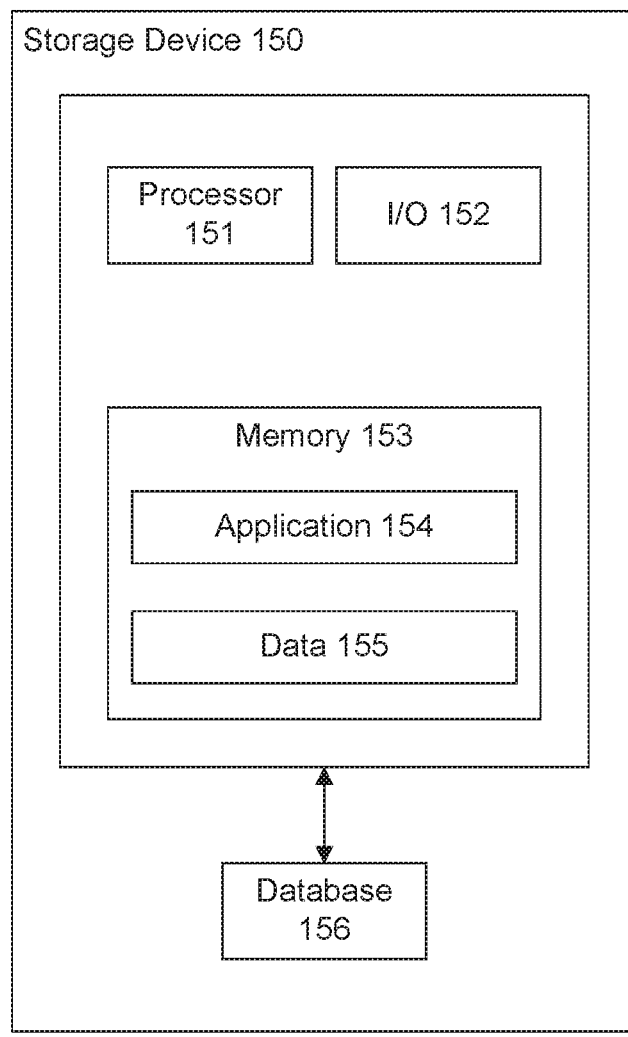
FIG. 1D is a diagram of an exemplary electronic system, consistent with disclosed embodiments.

FIG. 1D shows an exemplary configuration of storage device 150 consistent with disclosed embodiments. Variations of exemplary device 150 may be used to implement portions or all of devices of system 100, such as smart device 110, monitor device 120, tag device 130, and network 140. Likewise, even though FIG. 1D depicts storage device 150, it is understood that devices 110, 120, and 130 may implement portions illustrated by exemplary storage device 150. In one embodiment, storage device 150 may optionally include one or more processors 151, one or more input/output (I/O) devices 152, and one or more memories 153. In some embodiments, device 150 may take the form of a server, general purpose computer, mainframe computer, or the like. In some embodiments, device 150 may take the form of a mobile computing device such as a smartphone, tablet, laptop computer, or the like. Alternatively, device 150 may be configured as a particular apparatus, embedded system, dedicated circuit, or the like, based on the storage, execution, and/or implementation of the software instructions that perform one or more operations consistent with the disclosed embodiments.

Processor(s) 151 may include one or more known processing devices, such as mobile device microprocessors, desktop microprocessors, server microprocessors, or the like. The disclosed embodiments are not limited to a particular type of processor.

I/O devices 152 may be one or more devices configured to allow data to be received and/or transmitted by device 150. I/O devices 152 may include one or more digital and/or analog devices that allow storage device 150 to communicate with other machines and devices, such as other components and devices of system 100. For example, I/O devices 152 may include a screen for displaying messages to a user (such as a customer or retail venue manager). I/O devices 152 may also include one or more digital and/or analog devices that allow a user to interact with system 100, such as a touch-sensitive area, keyboard, buttons, or microphones. I/O devices 152 may also include other components known in the art for interacting with a user. I/O devices 152 may also include one or more hardware/software components for communicating with other components of system 100. For example, I/O devices 152 may include a wired network adapter, a wireless network adapter, a cellular network adapter, or the like. Such network components enable device 150 to communicate with other devices of system 100 to send and receive data.

Memory 153 may include one or more storage devices configured to store instructions usable by processor 151 to perform functions related to the disclosed embodiments. For example, memory 153 may be configured with one or more software instructions, such as one or more program applications 154 that perform one or more operations when executed by processor 151. The disclosed embodiments are not limited to separate programs or computers configured to perform dedicated tasks. For example, memory 153 may include a single program or multiple programs that perform the functions of mobile device 110, good monitor device 120, or tag device 130. Memory 153 may also store data 155 that is used by the one or more applications 154.

In certain embodiments, memory 153 may store software executable by processor 151 to perform one or more methods, such as the methods represented by the flowcharts depicted in FIGS. 3-6 and/or the methods associated with user interface (e.g., display 111) discussed above with reference to FIG. 1B. In one example, memory 153 may store one or more program applications 154. Applications 154 stored in memory 153, and executed by processor 151, may include a venue app that causes processor 151 to execute one or more processes related to financial services provided to customers including, but not limited to, processing credit and debit card transactions, checking transactions, processing payments for goods, price checking goods, analyzing customer purchasing behavior and adjusting good pricing based on the analysis, and/or adjusting good pricing. In some examples, program applications 154 may be stored in an external storage device, such as a cloud server located outside of network 140, and processor 151 may retrieve and execute the externally stored programs 154.

Storage Device 150 may be used to store data 155 relevant to examples described herein for system 100. One such example is the storage of location proximity data received from smart device 110, monitor device 120, or tag device 130. Data 155 may contain any data discussed above relating to the wireless communication of proximity based determinations. In addition, data 155 may contain customer profile 170 data such as purchasing behavior determinations, previous purchasing patterns, inventory listing of goods for sale, goods price, price comparison data, previous offered discounts for goods. The data 155 associated with particular customer or retail venue may also contain associated information for customers or retail venues. Data 155 may further include data unique for each good tag, as well as any information relative to any particular good. Data 155 may also include model 160 determinations and analysis.

Storage device 150 may include at least one database 156. Database 156 may be a volatile or non-volatile, magnetic, semiconductor, tape, optical, removable, nonremovable, or other type of storage device or tangible (i.e., non-transitory) computer readable medium. For example, database 156 may include at least one of a hard drive, a flash drive, a memory, a Compact Disc (CD), a Digital Video Disc (DVD), or a Blu-ray™ disc.

Database 156 may store data, such as data 155 that may be used by processor 151 for performing methods and processes associated with disclosed examples. Data stored in database 156 may include any suitable data, such as information relating to a customer, and/or a retail venue, information relating to transactions, and information model 160 and/or customer profile 170, data relating to the customer determinations, or modeled purchasing behavior. Although shown as a separate unit in FIG. 1D, it is understood that database 156 may be part of memory 153, or an external storage device located outside of system 100. At least one of memory 153, and/or database 156 may store data and instructions used to perform one or more features of the disclosed examples. At least one of memory 153, and/or database 156 may also include any combination of one or more databases controlled by memory controller devices (e.g., server(s), etc.) or software, such as document management systems, Microsoft SQL databases, Share Point databases, Oracle™ databases, Sybase™ databases, or other relational databases. Storage device 150 may also be communicatively connected to one or more remote memory devices (e.g., databases (not shown)) through network 140, or a different network. The remote memory devices may be configured to store information and may be accessed and/or managed by system 100. Systems and methods consistent with disclosed examples, however, are not limited to separate databases or even to the use of a database.

The components of device 150 may be implemented in hardware, software, or a combination of both hardware and software, as will be apparent to those skilled in the art. For example, although one or more components of device 150 may be implemented as computer processing instructions, all or a portion of the functionality of device 150 may be implemented instead in dedicated electronics hardware.

Storage device 150 also stores model 160 and customer profile 170. Through processor(s) 151, storage device 150 runs model 160 for performing methods and processes associated with disclosed examples described more fully below. Model 160 may analyze received data 155 for customers including, but not limited to, processed transactions, checked transactions, checked goods prices at third party retailer, processed payments for goods, purchasing customer behavior, and/or adjusted good pricing. In some examples, model 160 may be stored in an external storage device, such as a cloud server located outside of network 140 and storage device 150, and processor 151 may execute the model 160 remotely.

Customer profile 170 is a subset of data 155 stored in device 150 and analyzed by model 160. Data 155 is further associated with multiple customers and each respective customer has a customer profile that contains their associated purchasing behavior determinations and analysis.

Figure 2A:
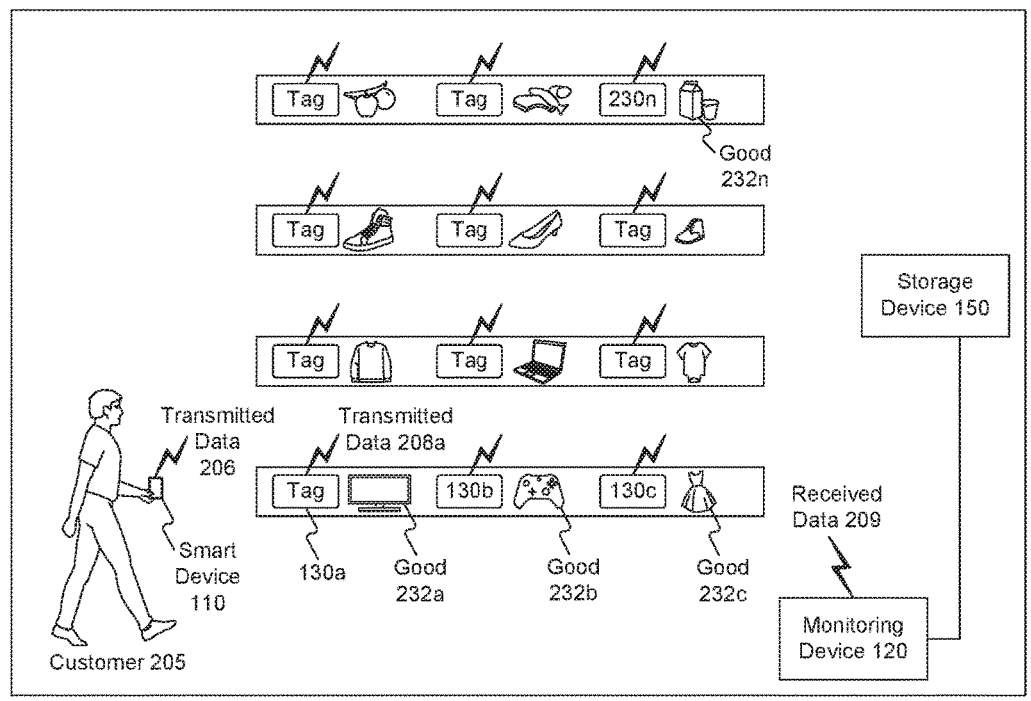
FIG. 2A is a diagram of an exemplary retail venue consistent with disclosed embodiments.

FIG. 2A illustrates an exemplary retail venue 200 system. Upon entry into retail venue 200, a customer 205 moves about the physical premises. Customer 205 has smart device 110 that communicates with monitoring device 120 and tag devices 130*a-n*, associated with respective goods 232*a-n*, as well as storage device 150. Smart device 110 transmits data 206 within venue 200 and accesses network 140. Tag devices 130*a-n* transmit data 208*a-n* to monitoring device 120, and/or smart device 110, and/or via network 140 to storage device 150. Monitoring device 120 receives data 209 from smart device 110 and tag devices 130*a-n* and further routes the data to storage device 150. Communication between smart device 110, monitoring device 120, and tag devices 130 may occur through various means. Some forms of communication, as already discussed, are near-field communication (NFC), Wi-Fi, Bluetooth, cellular, and/or other such forms of wireless communication discussed herein. In certain embodiments, smart device 110 and/or tag device 130 may include a power supply, such as a battery, configured to provide electrical power to one or more components of smart device 110 and/or tag device 130, such as processer 113/131, a memory 114/132, and a communication device 118/133. Alternatively, 130 may not include a power supply and, rather, communicate through passive RFID or other non-powered tag technology. In this non-powered instance, tag device 130 may only transmit data when it receives ambient energy transmitted by another device, such as smart device 110 or monitoring device 120 (e.g., tag device 130 emitting a signal after receiving energy from radio waves generated by smart device 110 or monitoring device 120). Thus, in embodiments where device 130 is non-powered, tag device 130 may receive electromagnetic energy from another device and use that energy to transmit data stored within. Alternatively, smart device 110 and/or tag device 130 may store location proximity data within an internal memory component (i.e., memory 114 and/or 132), or the devices 110 and/or 130 may continuously transmit their location data to monitoring device 120.

FIG. 2A depicts a wired connection between monitoring device 120 and storage device 150, but it is further understood that this connection is possible either through wired or wireless communication means as discussed throughout here.

A person of ordinary skill will now understand that the retail venue 200 system and good 232*a-n* placement throughout the retail venue can be altered to better suit the store owner and customer. For instance, based on collected data and/or model 160, popular items may be relocated near the check-out area or by the entrance to catch the attention of customer 205. Alternatively, goods 232*a-n* can be placed near each other based on past determined interests in prospective goods.

In particular, FIG. 2A illustrates product tag device 130*a* located on a venue shelf adjacent to good 232*a* (i.e., a TV set in FIG. 2A). Tag device 130*a* is configured to transmit signal 208*a* with enough power so that signal 208*a* is detectable within venue 200, and in particular, by monitoring device 120. Customer 205 carries smart device 110, which is configured to receive signal 208*a* from tag device 130*a* and/or transmit its own signal 206, along with collected proximity data to tag devices 130*a-n*, which is further detected by monitoring device 120 or routed to network 140 (and back to storage device 250) by other means. It is further understood that smart device 110 may receive and transmit signals, and it may also by-pass monitoring device 120. Signals 206 and 208*a-n* are collected by storage device 150, either through network 140 or monitoring device 120, and customer profile 170 further determines customer 205 locations relative to goods tags 130*a-n*.

Figure 2B:
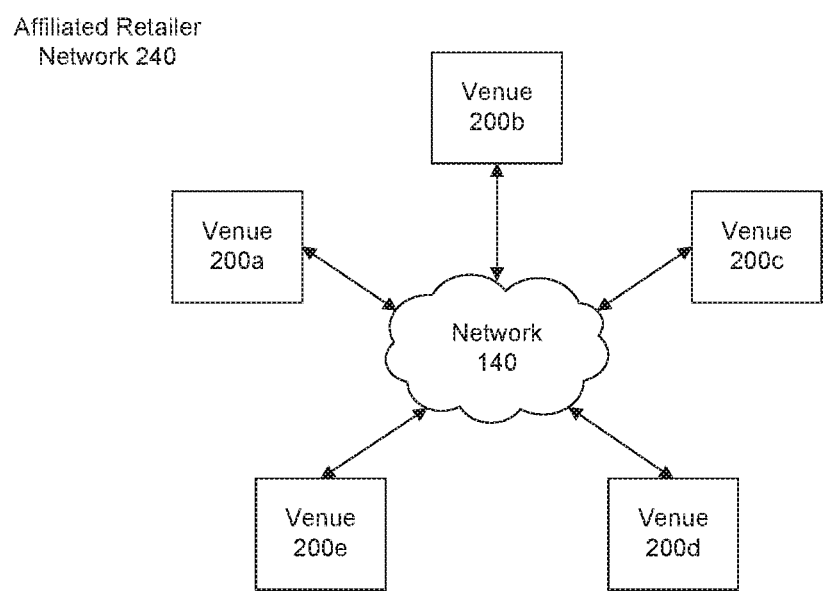
FIG. 2B is a block diagram of an exemplary system, consistent with disclosed embodiments.

FIG. 2B shows network 140 may be further associated with an affiliated retailer network 240 including retail venues 200*a*-200*e*. Storage devices associated with venues 200*a*-200*e*, connected through affiliated retailer network 240, collect multiple customer profiles 170 for multiple customers 205 at venue 200*a*, as well as, similar data from venues 200*b-e*. Affiliated retailer network 240 may further gather model analysis from each of the venues 200a-e and store the gathered analysis at any storage device 150 in the affiliated venues 200a-e. Affiliated retailer network 240 further provides communication between venues 200a-e through network 140.

Figure 3:
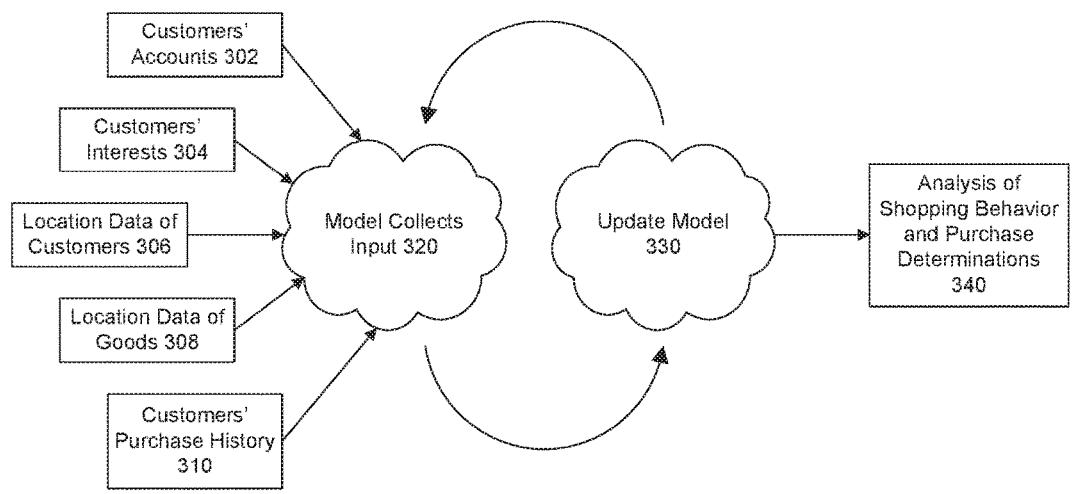
FIG. 3 is a flowchart of an exemplary process for modeling and analyzing customer shopping behavior and purchase determinations.

FIG. 3 is a is a flow chart of an exemplary process for modeling, to build model 160, collected data from venues 200a-e, tag devices 130a-n, and smart devices 110. The process begins by collecting input 320 such as customers' accounts 302, customers' interests 304, customers' location data 306, goods location data 308, and customers' purchase history 310. As discussed above, customers' profiles 302 contain data collected by monitoring devices 120 and storage devices 150 across respective venues 200a-e. The customers' profiles may contain the above mentioned data collected at step 320, such as customers' accounts 302, customers' interests 304, customer location data 306 in the retail venues, associated goods data 308 within proximity to each customer, and customers' purchase history 310 at each venue 200a-e, but the customers' profiles generally include the determined analysis of customers' interests in purchasing select goods, as determined by model 160. A customer's account 302 may be a customer configured profile affiliated with the venues 200a-e. The customer may further configure account 302 to provide secure access to the customer's purchasing information and shipping information. And the customer may further customize a shopping list on account 302. Each customer's interests 304 may be a collection of pre-selected interests of the customer from either smart device 110 or customer account 302. For example, customer 205 may update its account 302 with fruit produce brand preferences and this information may be further routed via network 140 to model 300 (at step 320) to determine future interests. Alternatively, customer 205, via smart device 210 or similar device, may notify retail venue 200, via network 140, of an intended shopping list from account 302, and customer interest 304 information containing the shopping list from account 302 will also transmitted to model 300. Location data 306 and 308 will continuously be monitored, while the respective smart device 110 and good tag devices 130a-n, are within retail venues 200a-e. This location data contains proximity data and time durations. For instance, this location data may contain proximity distance data between smart device 110 and good tag devices 130a-n, as well as, time duration data indicating how long device 110 and good tag devices 130a-n were within proximity to each other. Model 300 also receives, at step 320, customers' purchase history 310 from venues 200a-e. Purchase history data may include information for every good purchase in venues 200a-e, by customer 205, as well as the pricing for each good, the discounted offers for each good, the price checked comparison for each good, the adjusted prices for each good, and even the rejected goods customer 205 decided not to purchase (after specifically being offered a discount or after it was determined customer 205 would purchase the good).

Next, at step 330, model 300 is updated with the newly received data from step 320. Steps 320 and 330 are performed in real time and model 300 continuously receives data and updates itself based on the new data. Then at step 340, model 300 analyzes the received data 320 to determine micro and macro purchasing patterns for specific customers and the collective customers for all venues 200a-e. Model 300 may employ various machine learning techniques to analyze the collected data 320. Examples of machine learning techniques include decision tree learning, association rule learning, artificial neural networks, inductive logic programming, support vector machines, clustering, Bayesian networking, reinforcement learning, representation learning, similarity and metric learning, spare dictionary learning, rule-based machine learning, etc. For example, at step 340, model 300 may analyze the proximity data and time duration data received in step 320 and determine that customer 205 is interested in certain goods because device 110 was within proximity to good tag devices 130a-n for a set amount of time (e.g., three minutes). And as model 300 learns, from above techniques, this time duration trigger may adjust such that customer 205's proximity to goods for less than three minutes may also indicate an interest in the goods.

A person of ordinary skill will now understand that through these modeling steps, system 100 further facilitates the goal of tracking customer proximity to goods and offering an improved retail shopping experience. By utilizing customer and good location data, and machine learning, model 300 may further assist the store owner by providing analytics to properly stock the retail venue, and track purchasing trends at micro and macro levels. The analytics can determine accurate shopping trends to enable the retail venue owner to negotiate favorable purchases, on the supply side, and in return, offer favorable retail pricing on the demand side.

Figure 4:
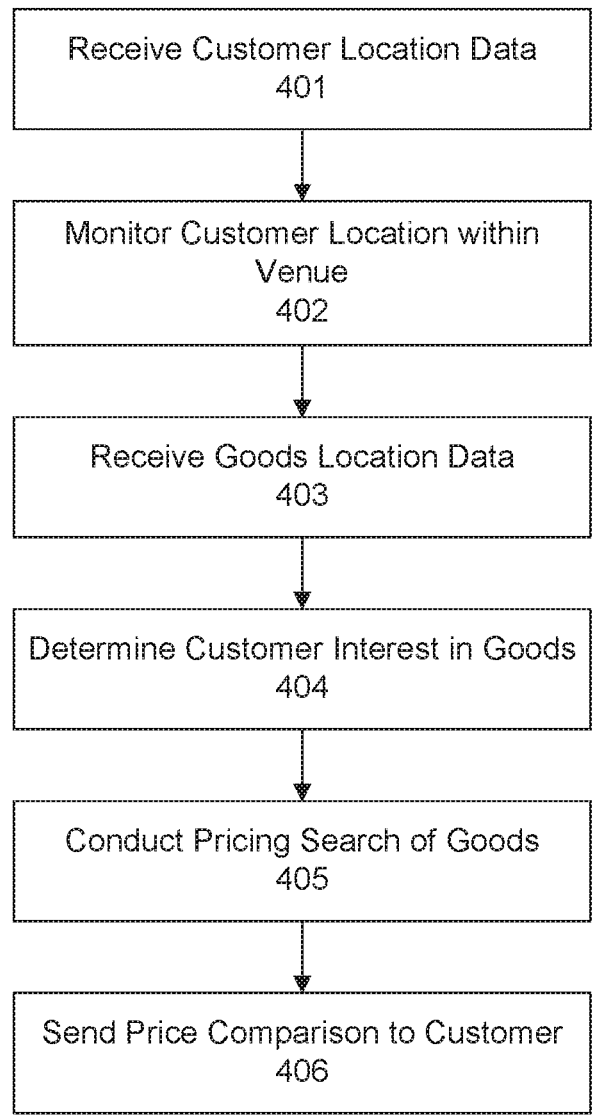
FIG. 4 is a flowchart of an exemplary process for determining a customer interest in goods and sending a price comparison to the customer.

FIG. 4 is a flowchart of an exemplary process for determining customer 205 interest in goods 232a-n in retail venue 200, any one of goods 232a-n more generally referred to therein as goods 232. The process begins at step 401, where monitoring device 120 enters scanning mode, whereby it detects and receives customer 205 location data from venue 200, either by direct communication between smart device 110 and device 120 or through network 140. At step 402, monitoring device 120 continuously receives data from smart device 110 and monitors the customer 205 (associated with device 110) locations within venue 200. In addition, monitoring device 120 continuously scans for signals from tag devices 130a-n as well.

At step 403, monitoring device 120 receives associated goods 232 locations from tag devices 130a-n within venue 200. Monitoring device may scan for tag devices 130a-n in particular zones within venue 200. In some embodiments, tag devices 130a-n may begin transmitting data in step contemporaneously with step 403 when smart device 110 is detected within proximity. For example, where device 130 is implemented as a Bluetooth Low Energy tag, tag device 130 may transmit data at the end of a time interval (e.g., such as every 500 ms). In embodiments where tag device 130 is a powered tag, step 403 may represent a periodic sending of data by tag device 130. In other embodiments, such as those where passive RFID or other non-powered tags are used, tag device 130 may only transmit data when it receives ambient energy transmitted by smart device 110 (e.g., emitting a signal after receiving energy from radio waves generated by smart device 110). Thus, in embodiments where tag device 130 is a non-powered tag, step 403 may represent device 130 receiving electromagnetic energy from smart device 110 and using that energy to transmit data stored in tag device 130.

In step 404, system 100 determines customer 205 interest in goods 232 by analyzing the received location data of goods 232 and customer 205 location data, and as a duration of customer 205 lingering in proximity to goods 232. System 100 may analyze the received data and deduce customer interest by triggers other than proximity and duration, for instance, such as noting the particular good is listed on the account of customer 205.

At step 405, system 100 conducts a price search for goods 232 determined to be of interest to customer 205 in step 404. Prior to customer 205 checking out, system 100 will check for lower prices of goods, either in goods held by customer 205, or in goods determined to be of interest to customer 205. System 100 will compare the current pricing at retail venue 200 against other non-affiliated retail venues elsewhere, either physically nearby or online. System 100 will further notify customer 205 of the results of this price comparison, at step 406, via network 140 and smart device 110.

Figure 5:
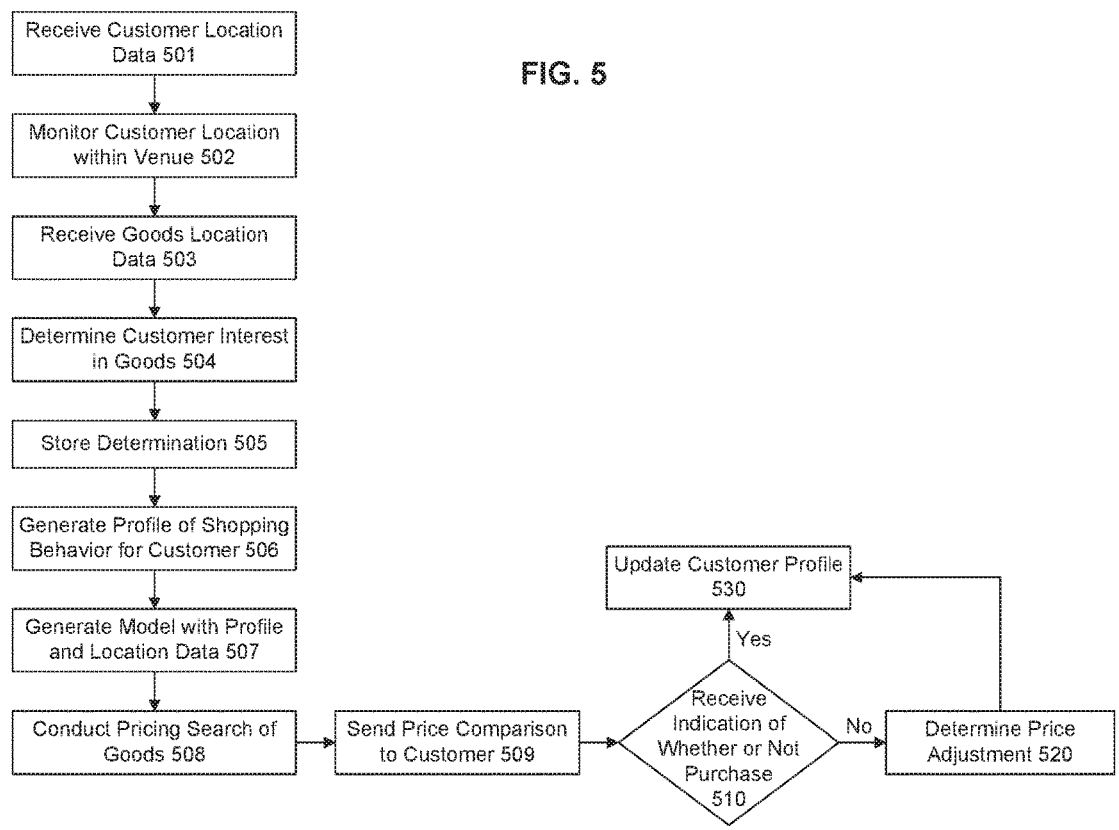
FIG. 5 is a flowchart of an exemplary process for determining a customer interest in goods, sending a price comparison, and updating the customer profile based on purchase behavior.

FIG. 5 is a flowchart of an exemplary process for determining the interest of customer 205 in goods 232a-n with tag devices 130a-n and smart device 110 in retail venue 200. The process begins with step 501, where monitoring device 120 enters scanning mode, by detecting transmitted signals 206 and 208, and receives location data of customer 205 from venue 200, either by direct communication between smart device 110 and device 120 or through network 140. At step 502, monitoring device 120 continuously receives data from smart device 110 and monitors customer 205 (associated with device 110) locations within venue 200. In addition, monitoring device 120 continuously scans for signals from tag devices 130a-n.

At step 503, monitoring device 120 receives associated goods (232a-n) locations from tag devices 130a-n within venue 200. Monitoring device may scan for tag devices 130a-n in particular zones within venue 200. In some embodiments tag devices 130a-n may begin transmitting data in step contemporaneously with step 503 when smart device 110 is detected within proximity. For example, where device 130 is implemented as a Bluetooth Low Energy tag, tag device 130 may transmit data at the end of a time interval (e.g., such as every 500 ms). In embodiments where tag device 130 is a powered tag, step 503 may represent a periodic sending of data by tag device 130. In other embodiments, such as those where passive RFID or other non-powered tags are used, tag device 130 may only transmit data when it receives ambient energy transmitted by smart device 110 (e.g., emitting a signal after receiving energy from radio waves generated by smart device 110). Thus, in embodiments where tag device 130 is a non-powered tag, step 503 may represent tag device 130 receiving electromagnetic energy from smart device 110 and using that energy to transmit data stored in tag device 130.

In step 504, system 100 determines customer 205 interest in goods 232 by analyzing the received location data of goods 232 and customer 205 location data, and a duration of customer 205 lingering in proximity to goods 232. System 100 may analyze the received data and deduce customer interest by triggers other than proximity and duration, for instance, such as noting the particular good is listed on the account of customer 205. At step 505, system 100 stores step 504 determinations for customer 205 in storage device 150. Based on the stored determinations and received data from steps 501-504, system 100 generates customer profile 170 in step 506. The generated profile 170 generally contains information used to deduce the customer 205 shopping behavior. For instance, and as discussed above with reference to FIG. 3, the generated profile 170 may contain customer interests, customer location data in the retail venue, associated goods data within proximity to customer, and customer purchase history at venue 200, but profile 170 generally includes the determined analysis of customer's interest in purchasing select goods.

At step 507, system 100 generates model 160 with profile 170, locations, and shopping behavior data for customer 205. Like model 300, the generated model 160 from step 507 will analyze the shopping trend, behavior, and purchase determinations of customer 205.

At step 508, system 100 conducts a price search for the goods 232 in which it was determined that the customer 205 has interest at step 504. Prior to customer 205 checking out, system 100 will check for lower prices of goods, either in goods held by customer 205, or in goods determined to be of interest to customer 205. System 100 will compare the current pricing at retail venue 200 against other non-affiliated venues elsewhere, either physically or online. System 100 will further notify customer 205 of the results of this price comparison, at step 509, via networks 140 and smart device 210.

At step 510, system 100 receives indication whether or not customer 205 purchased goods 232. Not only will system 100 receive indication of all actual purchased goods by customer 205, but it will also receive indication whether customer 205 purchased goods subject to the step 509 price comparison. Monitoring device 120 further communicates, to storage device 150, the location data from steps 501-503 and received financial transaction data such that processor(s) 151 further deduces what goods 232a-n were purchased by customer 205. If it is further determined that the good(s) subject to the step 509 price comparison was not purchased, then system 100 further determines price adjustments at step 520. For example, if system 100 determines that customer 205 continues to be interested in good 232 but fails to purchase good 232 after multiple trips to venue 200, then system may determine a new favorable price for good 232 to incentivize future purchase. The price adjustment at step 520 may be for just a particular goods 232, or for collective goods 232a-n, in the form of a future rebate or price reduction offer.

System 100 then updates the customer purchase behavior profile at step 530. If system 100 receives indication that customer 205 purchased good 232 then at step 530, system 100 updates the customer purchase behavior profile. Alternatively, if system 100 receives indication that customer 205 did not purchase good 232, even after receiving a future rebate or price reduction offer at step 520, then at step 530, system 100 updates the customer purchase behavior profile.

Figure 6:
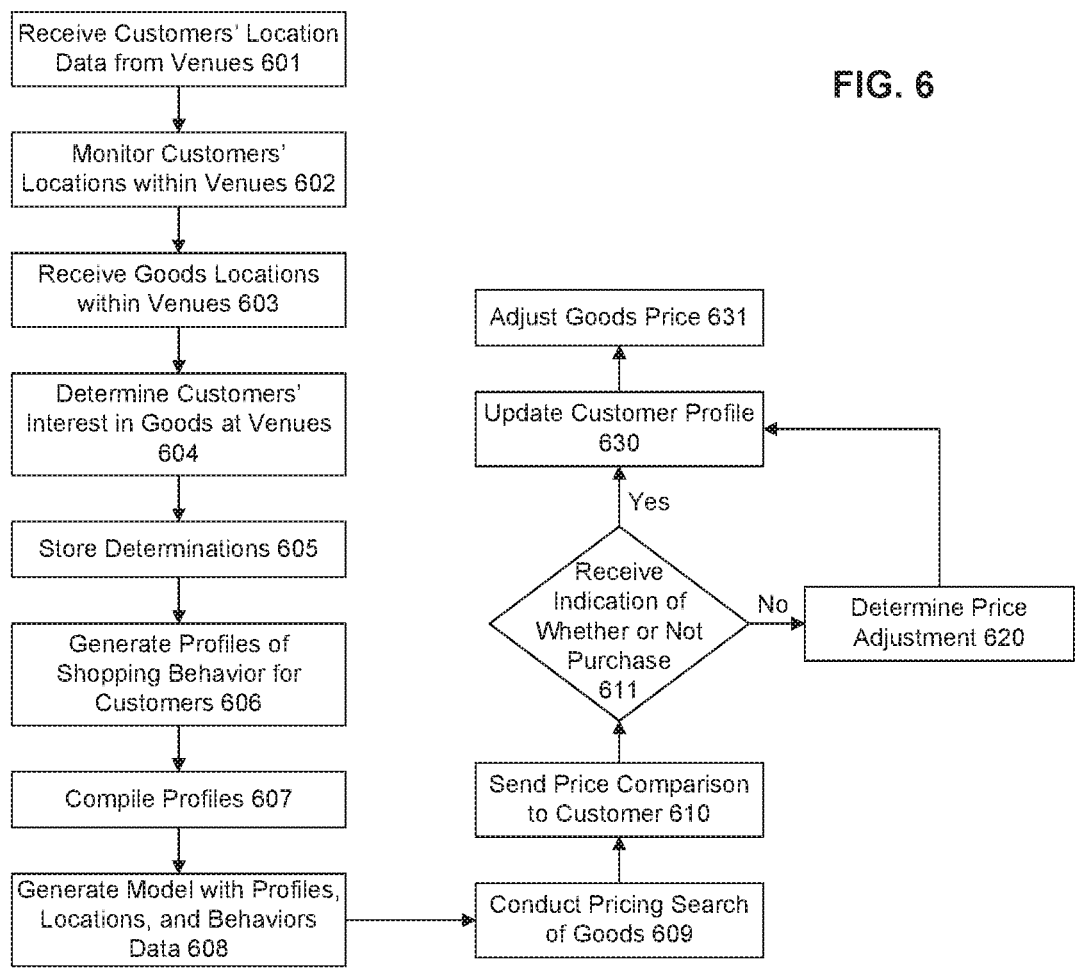
FIG. 6 is a flowchart of an exemplary process for determining multiple customers interest in goods for multiple affiliated venues.

FIG. 6 is a flowchart of an exemplary process for determining the interest of multiple customers 205 in goods 232a-n associated with good tag devices 130a-n across affiliated network 140, where each of these multiple customers 205 has one of smart devices 110 at retail venues 200a-200e. The process begins at step 601, where monitoring device 120 at each retail venue 200a-200e enters scanning mode, detecting transmitted data signals 206 and 208, and receives location data of customer 205 from venues 200a-e via either direct communication between smart devices 110 and each monitoring device 120 or through network 140. At step 602, monitoring device 120 continuously receives data from multiple smart devices 110 and monitors locations of multiple customers 205 (associated with devices 110) within venues 200a-e. In addition, monitoring device 120 continuously scans for signals from tag devices 130a-e.

At step 603, monitoring device 120 receives associated goods (232a-n) locations from tag devices 130a-n within venues 200a-e. Monitoring device 120 may scan for tag devices 130a-n in particular zones within venues 200a-e. In some embodiments tag devices 130a-n may begin transmitting data in step contemporaneously with step 603 when smart device 110 is detected within proximity. For example, where tag device 130 is implemented as a Bluetooth Low Energy tag, tag device 130 may transmit data at the end of a time interval (e.g., such as every 500 ms). In embodiments where tag device 130 is a powered tag, step 603 may represent a periodic sending of data by tag device 130. In other embodiments, such as those where passive RFID or other non-powered tags are used, tag device 130 may only transmit data when it receives ambient energy transmitted by smart device 110 (e.g., emitting a signal after receiving energy from radio waves generated by smart device 110). Thus, in embodiments where device 130 is a non-powered tag, step 603 may represent tag device 130 receiving electromagnetic energy from smart device 110 and using that energy to transmit data stored in device 130.

In step 604, system 100 determines customer 205 interest in goods 232 by analyzing the received location of goods data 232 and customer 205 location data, and a duration of customer 205 lingering in proximity to good 232. System 100 may analyze the received data and deduce customer interest by triggers other than proximity and duration, for instance, such as noting the particular good is listed on the account of customer 205. At step 605, system 100 stores step 604 determinations for customer 205 in storage device 150. Based on the stored determinations and received data from steps 601-604, system 100 generates customers profiles 170 for each respective customer in step 606. The generated profiles 170 generally contain information used to deduce the particular customer 205 shopping behavior. For instance, and as discussed above with reference to FIG. 3, the generated profiles may contain customer interests, customer location data in the retail venues, associated goods data within proximity to customer, and customers purchase history at each venue 200a-e, but generally consist of the determined analysis of customer's interest in purchasing select goods.

At step 607, storage device 250 compiles the generated profiles 170. Step 607 may occur on a micro level for each venue 200a-e or on a macro level for all venues. Likewise, step 607 may occur only for a specific customer 205 or group of customers. At step 608, system 100 generates a model with the profiles, locations, and shopping behaviors data for customers 205. Like the compiled profiles, one collective model may be generated for all venues 200a-e and all customers, or specific models may be created for specific ones of venues 200a-e and even one specific customer 205. Like model 300, the models generated in 608 will analyze the shopping trends, behavior, and purchase determinations of customers 205.

At step 609, system 100 conducts a price search for goods 232 in which it was determined that the customers 205 have interest at step 604. Prior to each customer 205 checking out, system 100 will check for lower prices of goods, either in goods held by customer 205, or in goods determined to be of interest to customer 205. System 100 will compare the current pricing at the retail venue where customer 205 is located, e.g., retail venue 200a, against other local retail venues 200b-e or non-affiliated retail venues elsewhere, either physically nearby or online. System 100 will further notify customer 205 of the results of this price comparison, at step 610, via network 140, and smart device 110.

At step 611, system 100 receives indication whether or not customer 205 purchased goods 232. Not only will system 100 receive indication of all actual purchased goods by customer 205, but it will also receive indication whether customer 205 purchased goods subject to the step 610 price comparison. Monitoring device 120 further communicates, to storage device 150, the location data from steps 601-603 and received financial transaction data that processor(s) 151 further deduces what goods 232a-n were purchased. If it is further determined that the good(s) subject to the step 610 price comparison was not purchased, then system 100 further determines price adjustments at step 620. For example, if multiple customers 205 decide not to purchase a particular good 232 after price comparison step 610, then system 100 may determine that a more competitive price is required. Alternatively, if system 100 determines that a particular one of customers 205 continues to be interested in good 232 but fails to purchase good 232 after multiple trips to venue 200, then system 100 may determine a new favorable price for good 232 to incentivize future purchase. These price adjustment determinations may be across all retail venues 200a-e, or at just one retail venue 200. The price adjustment at step 620 may be for just the particular good 232 and further just for the particular customer 205 in the form of a future rebate or price reduction offer.

System 100 then updates the customer purchase behavior profile at step 630. If system 100 receives indication that customer 205 purchased good 232, then at step 630, system 100 updates the customer purchase behavior profile. Alternatively, if system 100 receives indication that customer 205 did not purchase good 232, even after receiving a future rebate or price reduction offer at step 520, then at step 530, system 100 updates the customer purchase behavior profile Like profile compiling step 607 and model generation step 608, this updated profile step 630 may be conducted for a particular customer 205 or multiple customers 205, and/or for just one venue 200a or multiple venues 200b-e. At step 631, based on the updated model and customer purchasing profiles, system 100 further adjusts goods 232 to remain competitive with third party retail venues presented during the price comparison in step 609 and to further follow purchasing trends at micro retail venue and customer levels, as well as the collective macro level purchasing trends across all affiliated retail venues 200a-n.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The elements in the claims are to be interpreted broadly based on the language employed in the claims and not limited to examples described in the present specification or during the prosecution of the application, which examples are to be construed as non-exclusive. It is intended, therefore, that the specification and examples be considered as exemplary only, with a true scope and spirit being indicated by the following claims and their full scope of equivalents.

What is claimed is:

1. A system for determining customer interest in goods, comprising:
  one or more memory devices storing instructions; and
  one or more processors configured to execute the instructions to:
    receive customer location data from a smart device associated with a customer indicating the customer is within a retail venue of a retailer;

monitor, based on the customer location data, a current location of the customer within the retail venue;

receive goods location data from a plurality of transmitter devices indicating locations of goods for sale within the retail venue;

monitor, based on the goods location data, a current location of the goods within the retail venue;

determine that the customer is interested in a particular good for sale within the retail venue based on one of the current customer location remaining in proximity to the current location of the particular good for a predetermined period of time, or a listing of the particular good within proximity to the customer on a customer account;

store each determination that the customer is interested in the particular good for sale within the retail venue;

generate a profile of shopping behavior of the customer based on the stored interest determinations;

conduct a search of pricing of the particular good at one or more other retailers;

send a price comparison to the customer for the particular good based on results of the price search; and generate a model of the customer interest in a plurality of goods at the retail venues.

2. The system of claim 1, the one or more processors being further configured to:

receive location data of other customers within the retail venue;

determine interests of the other customers in goods at the retail venue;

store the interest determinations of the other customers; and generate a profile of shopping behavior of each of the other customers.

3. The system of claim 2, the one or more processors being further configured to:

compile the generated shopping behavior profiles to generate a model of aggregate customer interest in a plurality of products at the retail venue.

4. The system of claim 1, the one or more processors being further configured to:

receive information indicating whether the customer purchases the particular good after receiving the price comparison.

5. The system of claim 4, wherein if the customer does not purchase the particular good after receiving the price comparison, the one or more processors are further configured to send to the customer smart device a discounted price for the good.

6. The system of claim 4, if the customer does not purchase the particular good after receiving the price comparison, the one or more processors are further configured to determine whether to adjust a price of the particular good.

7. The system of claim 1, the one or more processors being further configured to:

determine whether the customer decided to purchase the good based on the monitored location of the customer and the location of the good.

8. The system of claim 7, the one or more processors being further configured to:

generate a model that analyzes the customer shopping behavior profile and purchase determination.

9. The system of claim 8, the one or more processors being further configured to:

send, based on the model analysis, to the customer smart device a discounted price for the good.

10. The system of claim 9, the one or more processors being further configured to:

receive information indicating whether the customer purchases the particular good after receiving the discounted price; and update the customer shopping behavior profile.

11. The system of claim 1, wherein the customer includes a plurality of customers and the retail venue includes a plurality of retail venues, the one or more processors being further configured to:

receive customer location data from smart devices associated with the plurality of customers at the plurality of retail venues;

monitor, based on the customer location data, a current location of the customer within the retail venues;

receive goods location data indicating locations of goods for sale in the retail venues;

monitor, based on the goods location data, a current location of the goods within the retail venues;

determine interests of the customers in the goods in the retail venues based on one of the locations of the customers remaining in proximity to the current locations of the goods in the retail venues for a predetermined period of time, or listings of the particular goods within proximity to the customers on the customer account;

store each determination that each of the customers is interested in a good for sale in one of the retail venues; and generate a shopping behavior profile of each of the customers based on the stored interest determinations.

12. The system of claim 11, the one or more processors being further configured to:

compile the generated shopping behavior profiles for the customers to generate a model of aggregate customer interest in a plurality of goods at the retail venues.

13. The system of claim 12, wherein the plurality of retail venues are affiliated with a common business entity.

14. The system of claim 13, the one or more processors being further configured to determine whether each of the customers decides to purchase the goods based on the monitored locations of the customers and the locations of the goods.

15. The system of claim 14, wherein generating a model of aggregate customer interest includes receiving and analyzing the determined decisions to purchase the goods by the customers.

16. The system of claim 15, the one or more processors being further configured to receive information indicating whether the customers purchase the particular good after receiving the price comparison.

17. The system of claim 16, wherein if any one of the customers does not purchase the particular good after receiving the price comparison, the one or more processors are further configured to send to the smart device of the non-purchasing customer a discounted price for the good.

18. The system of claim 17, wherein the offered discounted price is adjusted based on the generated model analysis.

19. The system of claim 17, if any one of the customers does not purchase the particular good after receiving the price comparison, the one or more processors are further configured to determine whether to adjust the price of the particular good at the retail venue, or all affiliated retail venues.

* * * * *